United States Patent
Jeong et al.

(10) Patent No.: US 9,461,784 B2
(45) Date of Patent: Oct. 4, 2016

(54) RRC MESSAGE TRANSMISSION METHOD IN WIRELESS COMMUNICATION SYSTEM

(75) Inventors: Hong Kyu Jeong, Suwon-si (KR); Jae Ho Jeon, Seongnam-si (KR); Byung Suk Kim, Seoul (KR); Seung Joo Maeng, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 680 days.

(21) Appl. No.: 12/657,415

(22) Filed: Jan. 20, 2010

(65) Prior Publication Data
US 2010/0182952 A1   Jul. 22, 2010

(30) Foreign Application Priority Data
Jan. 22, 2009   (KR) .................. 10-2009-0005351

(51) Int. Cl.
H04L 1/18   (2006.01)
H04W 36/00   (2009.01)

(52) U.S. Cl.
CPC .......... *H04L 1/189* (2013.01); *H04W 36/0005* (2013.01)

(58) Field of Classification Search
CPC ................... H04L 1/189; H04W 36/0005
USPC ..................... 370/328, 338, 331
See application file for complete search history.

(56) References Cited

U.S. PATENT DOCUMENTS

| 7,996,744 B2* | 8/2011 | Ojala et al. .................. 714/748 |
| 2005/0181311 A1 | 8/2005 | Nakajima |
| 2008/0225817 A1* | 9/2008 | Moon et al. .................. 370/342 |
| 2009/0276672 A1 | 11/2009 | Lee et al. |
| 2009/0327828 A1 | 12/2009 | Ojala et al. |

FOREIGN PATENT DOCUMENTS

| KR | 20070101087 A | 10/2007 |
| WO | WO 2008/132599 A2 | 11/2008 |

OTHER PUBLICATIONS

Office Action dated Oct. 27, 2014 in connection with Korean Patent Application No. 10-2009-0005351; 5 pages.
Decision of Patent dated Sep. 30, 2015 in connection with Korean Patent Application No. 10-2009-0005351; 4 pages.

* cited by examiner

*Primary Examiner* — Mohammad Anwar (57) ABSTRACT

A Radio Resource Control (RRC) message transmission method and apparatus for a wireless communication system operating in TTI and acknowledge mode is configured to reduce interruption time by minimizing retransmission times of RRC message. The message transmission method for a wireless communication system includes generating, at a transmitter, a message; transmitting the message two or more times consecutively from the transmitter to a receiver; analyzing, at a receiver, the message transmitted by the transmitter; transmitting an acknowledge message or a negative-acknowledge from the receiver to the transmitter depending on the analysis result; and terminating, at the transmitter, a retransmission process of the message upon receipt of the acknowledgement message.

20 Claims, 7 Drawing Sheets

RRC MESSAGE TRANSMISSION METHOD IN WIRELESS COMMUNICATION SYSTEM

CROSS-REFERENCE TO RELATED APPLICATION(S) AND CLAIM OF PRIORITY

The present application is related to and claims priority to an application entitled "RRC MESSAGE TRANSMISSION METHOD IN WIRELESS COMMUNICATION SYSTEM" filed in the Korean Intellectual Property Office on Jan. 22, 2009 and assigned Serial No. 10-2009-0005351, the contents of which are incorporated herein by reference.

TECHNICAL FIELD OF THE INVENTION

The present invention relates to wireless communications and, in particular, to a Radio Resource Control (RRC) message transmission method and apparatus for a wireless communication system operating in TTI and acknowledge mode.

BACKGROUND OF THE INVENTION

In the wireless communication system operating in Transmission Time Interval (TTI) mode, the transmitter transmits a message at TTI, and the receiver performs Cyclic Redundancy Check (CRC) on the message received from the transmitter and reports the result to the transmitter. That is, the receiver in acknowledge mode determines whether the message has been received successfully and transmits an acknowledgement/negative acknowledgement (ACK/NACK) message to the transmitter based on the determination result.

In Long Term Evolution (LTE) system, Radio Resource Control (RRC) is responsible for controlling layer 3 signaling between User Equipment (UE) and evolved Node B (eNB), connection establishment and release, broadcast of system information, Radio Bearer establishment/reconfiguration and release, RRC connection mobility procedure, and the like. Typically, the RRC messages are exchanged in TTI mode, and the transmitter performs retransmission process depending on the response transmitted by the receiver.

Figure 1:
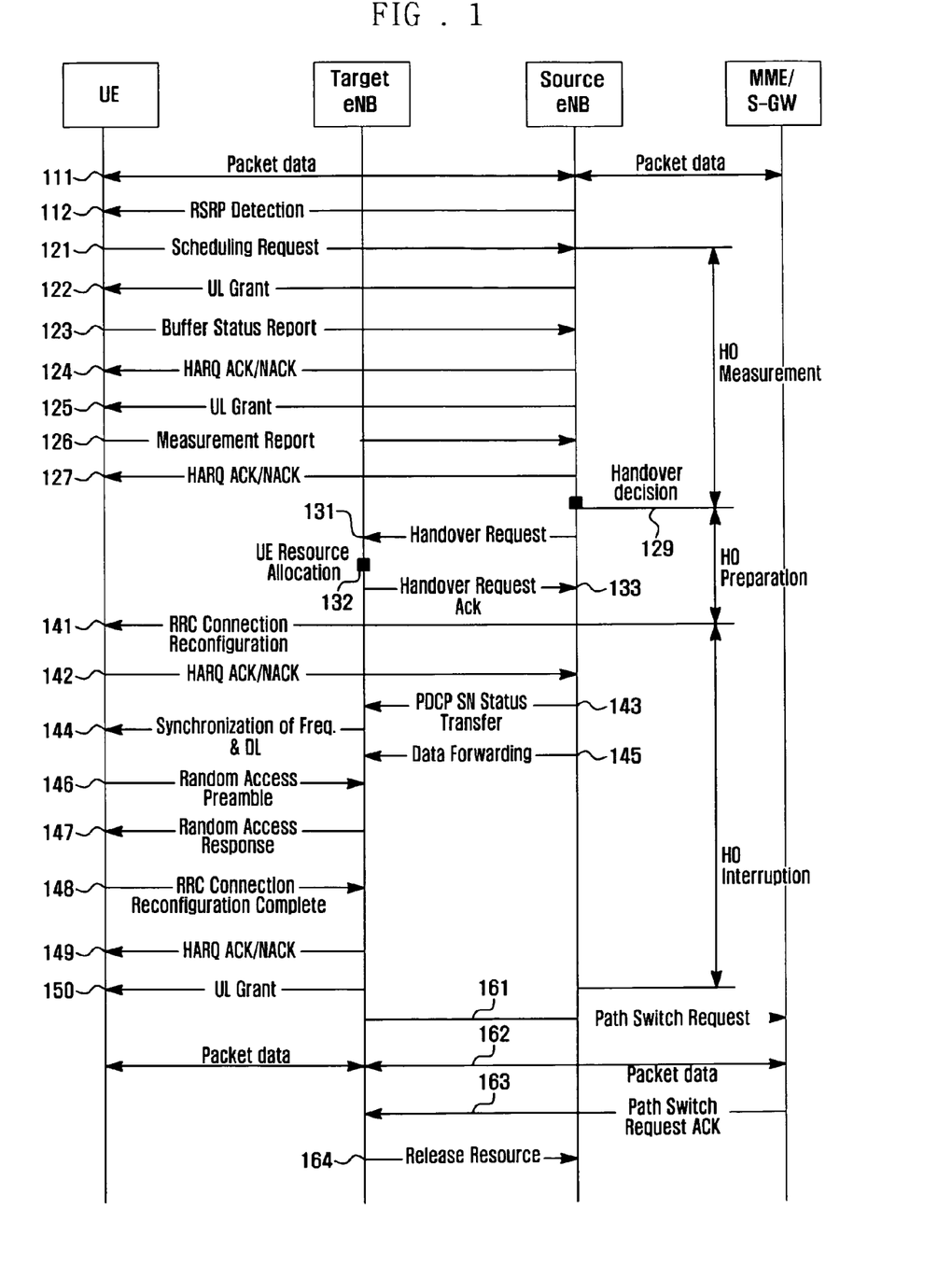
FIG. 1 illustrates a sequence diagram of the operations of a UE and network entities for a handover procedure in an LTE system.

A description is made of RRC message transmission procedure. FIG. 1 illustrates a sequence diagram of the operations of a UE and network entities for a handover procedure in an LTE system.

Referring to FIG. 1, a UE is communicating packet data 111 with a source eNB. During the communication, the source eNB sends a Reference Signal Received Power (RSRP) Detection signal 112 to the UE. Upon receipt of the RSRP Detection signal, the UE performs a handover measurement procedure 121 to 129 with the source eNB. During the handover measurement procedure, the UE performs Scheduling Request, Buffer Status Report, and Measurement Report to the source eNB. The source eNB sends an ACK/NACK message to the source eNB in response to the individual messages.

If a handover decision has been made, the source eNB performs a handover preparation procedure 131 to 133 with a target eNB. In the handover procedure, the source eNB sends a Handover Request message 131 to the target eNB, and the target eNB sends a Handover Request ACK message to the source message.

Once the handover has been prepared, the source and target eNBs and UE perform a handover interruption procedure 141 to 150. During the handover interruption procedure, the source eNB sends an RRC connection reconfiguration message to the UE and transfers a PDCP SN status message to the target eNB. The source eNB also forwards the data to the target eNB. After the establishment of a link between the UE and target eNB, the target eNB and the UE perform packet data communication. Thereafter, the target eNB sends a packet switch request message to a Mobility Management Entity/Source Gateway (MME/SGW) and performs then performs packet data communication with the UE.

In FIG. 1, the messages 123, 126, 141, and 148 are RRC messages transmitted in TTI mode, and the receiver sends an ACK/NACK message in response to the individual RRC messages. When a NACK message is received, the transmitter retransmits the corresponding message.

Figure 2:
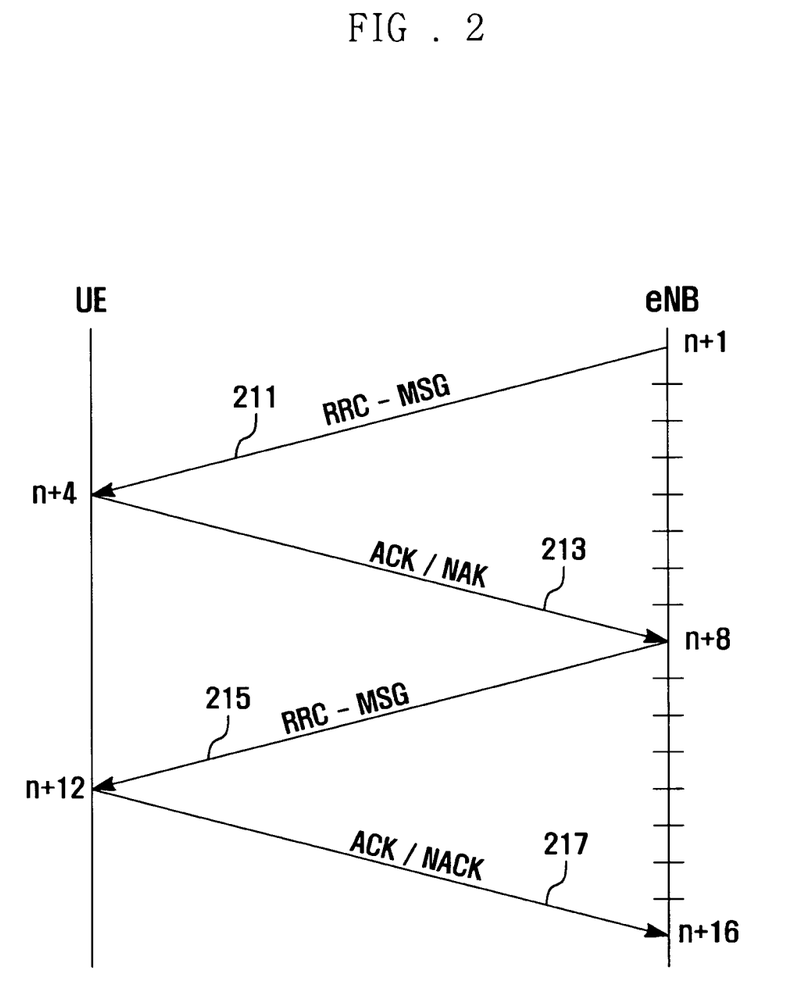
FIG. 2 illustrates a message flow diagram for an exchange of RRC messages and ACK/NACK messages between a UE and an eNB in a conventional wireless communication system operating in TTI mode.

FIG. 2 illustrates a message flow diagram for an exchange of RRC messages and ACK/NACK messages between a UE and an eNB in a conventional wireless communication system operating in TTI mode. In FIG. 2, the transmission party receives an ACK/NACK message in 8 TTIs after the transmission of an RRC message.

Referring to FIG. 2, the eNB sends an RRC message 221 to the UE. If the RRC message has been received, the UE checks the normality of received RRC message and sends an ACK/NACK message 213 in response to the RRC message depending on the normality check result. The eNB receives the ACK/NACK message in 8 TTIs after the transmission of the RRC. If the received RRC message is abnormal, the UE sends the NACK message to the eNB in response to the RRC message. Upon receipt of the NACK message, the eNB, as the transmitter, retransmits the RRC message 215 and receives the ACK/NACK message 217 in another 8 TTIs after the retransmission of the RRC message.

Since the eNB and UE communicate with each other through a radio link, the message transmitted by the eNB or UE can be lost due to the radio link problem or bad communication condition. For example, if the RRC message transmitted at step 211 has been erroneous or lost, the eNB must retransmit the RRC message at step 215, resulting in procedure delay of 8 TTIs. This means that the message loss causes the retransmission procedure delay equal to the time interval for retransmission in the periodical retransmission mode.

Assuming that the RRC message of FIG. 2 is the RRC connection reconfiguration message of FIG. 1 as a handover command and if the RRC connection reconfiguration message transmitted by the source eNB has been lost, the UE sends the NACK message to request the source eNB for the retransmission of the lost RRC message. Once the NACK message has been received, the source eNB retransmits the corresponding RRC message at a predetermined time, i.e., 8 TTIs after the initial transmission of the RRC message, resulting in handover interruption time.

There is therefore a need for a method to reduce the handover interruption time by minimizing the retransmission times of RRC message.

SUMMARY OF THE INVENTION

To address the above-discussed deficiencies of the prior art, it is a primary object to provide a RRC message transmission method that is capable of reducing the interruption time in a wireless communication system.

In accordance with an exemplary embodiment of the present invention, a message transmission method for a wireless communication system includes generating, at a transmitter, a message; transmitting the message two or more times consecutively from the transmitter to a receiver;

analyzing, at a receiver, the message transmitted by the transmitter; transmitting an acknowledge message or a negative-acknowledge from the receiver to the transmitter depending on the analysis result; and terminating, at the transmitter, a retransmission process of the message upon receipt of the acknowledgement message.

Preferably, transmitting the message includes generating duplicates of the RRC message on an RRC layer of the transmitter; and transmitting the duplicates of the RRC message consecutively through a physical layer by a Radio Link Control (RLC) layer or a Media Access Control (MAC) layer.

Preferably, transmitting the message includes generating, at an RRC layer of the transmitter, a consecutive transmission control information; transferring the RRC message with the consecutive transmission control information from the RRC layer to a Radio Link Control (RLC) layer; generating, at the RLC layer, duplicates of the RRC message based on the consecutive transmission control information; and transmitting, at the RLC layer, the duplicates of the RRC message to the receiver consecutively through a Media Access Control (MAC) and a Physical (PHY) layer.

Preferably, transmitting the message includes generating, at an RRC layer of the transmitter, a consecutive transmission control information; transferring the RRC message with the consecutive transmission control information from the RRC layer to a Radio Link Control (RLC) layer; transferring the RRC message with the consecutive transmission control information from the RLC layer to a Media Access Control (MAC) layer; generating, at the MAC layer, duplicates of the RRC message based on the consecutive transmission control information; and transmitting, at the MAC layer, the duplicates of the RRC message to the receiver consecutively through a Physical (PHY) layer.

In accordance with another exemplary embodiment of the present invention, a message transmission method of a user equipment (or base station) in a wireless communication system includes transmitting a message two or more times consecutively at a predetermined interval; receiving a reply at the predetermined interval in response to the message; and terminating, if the reply is an acknowledge message, a retransmission process of the message.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

In the following description, the present invention provides a method for reducing transmission delay caused by RRC message retransmission. In an exemplary embodiment of the present invention, the same RRC message is retransmitted repeatedly to increase the reception probability at the receiver. This means to reduce the number of retransmissions of an RRC message in TTI mode.

In a wireless communication system according to the present invention, the RRC message transmission method can be implemented in three different ways. In one embodiment, the RRC entity of a transmitter transmits multiple duplicates of an RRC message and checks the ACK/NACK message transmitted by the receiver. In another embodiment, the RRC entity of the transmitter generates an RRC message having information on the consecutive transmission of the RRC message and a corresponding Radio Link Control (RLC) entity transmits multiple duplicates of the RRC message based on the consecutive transmission information and checks the ACK/NACK message transmitted by the receiver. In yet another embodiment, the RRC entity of the transmitter generates an RRC message with the information on the consecutive transmission and a corresponding Media Access Control (MAC) entity transmits multiple duplicates of the RRC message based on the consecutive transmission information and checks the ACK/NACK message transmitted by the receiver.

The RRC message transmission method according to an exemplary embodiment of the present invention processes the duplicates of an RRC message as multiple consecutive RRC messages virtually and transmits the consecutive RRC messages within a period of one or more TTIs. The consecutive RRC message retransmission according to an exemplary embodiment of the present invention does not need to modify the other layers and procedures specified in the standard. The RRC (or RLC) entity of the transmitter checks the response message transmitted by the receiver and, if the RRC message has been received successfully at the receiver (i.e., the ACK message has been received), skips retransmission of the RRC message and drops the response message received after this. That is, the RRC (or RLC or MAC) entity stops retransmission of the RRC message upon receipt of the first ACK message transmitted in response to the RRC message.

Figure 3:
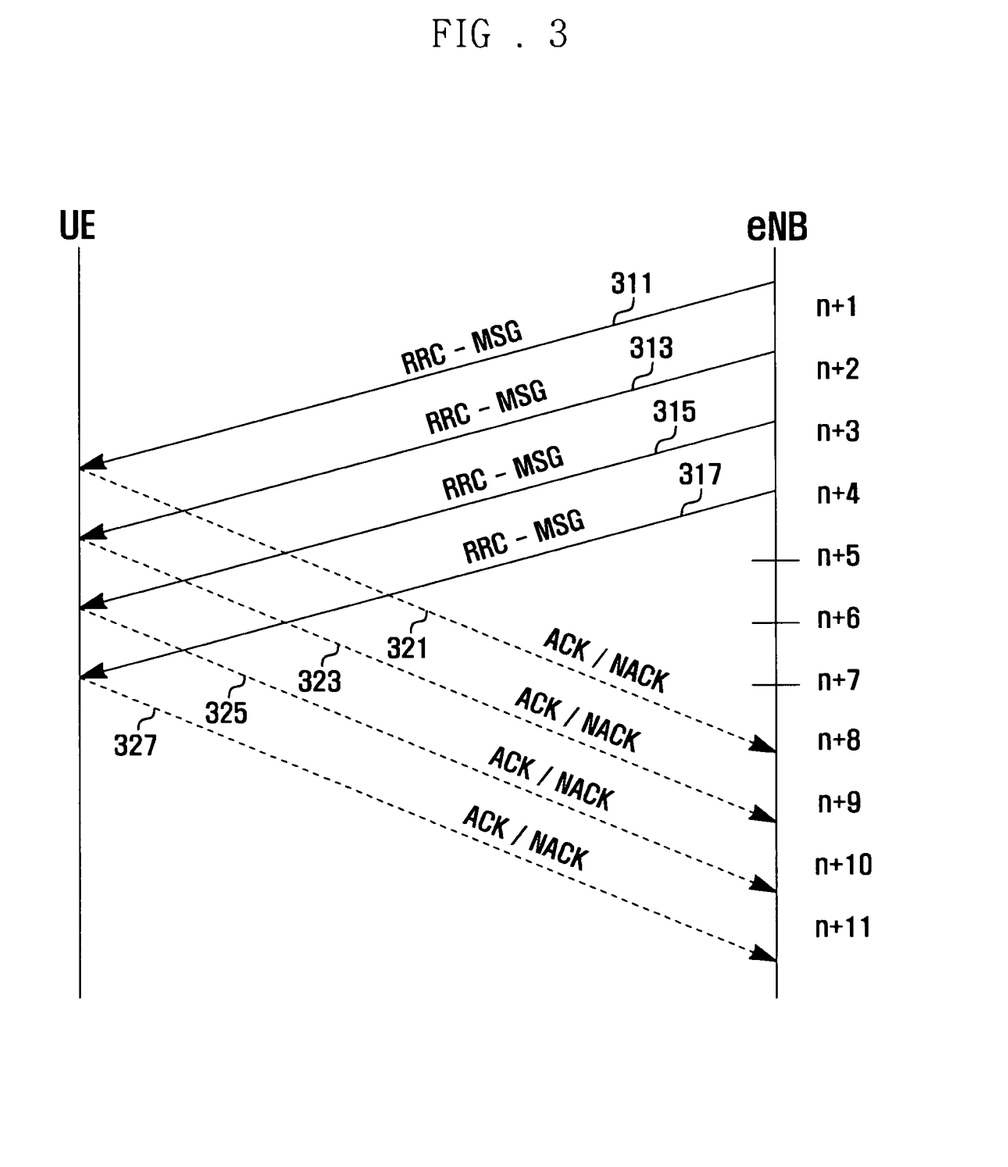
FIGS. 3 and 4 illustrate message flow diagrams for an exchange of RRC messages and ACK/NACK messages between a UE and an eNB in an RRC message transmission method according to an exemplary embodiment of the present invention.
Figure 4:
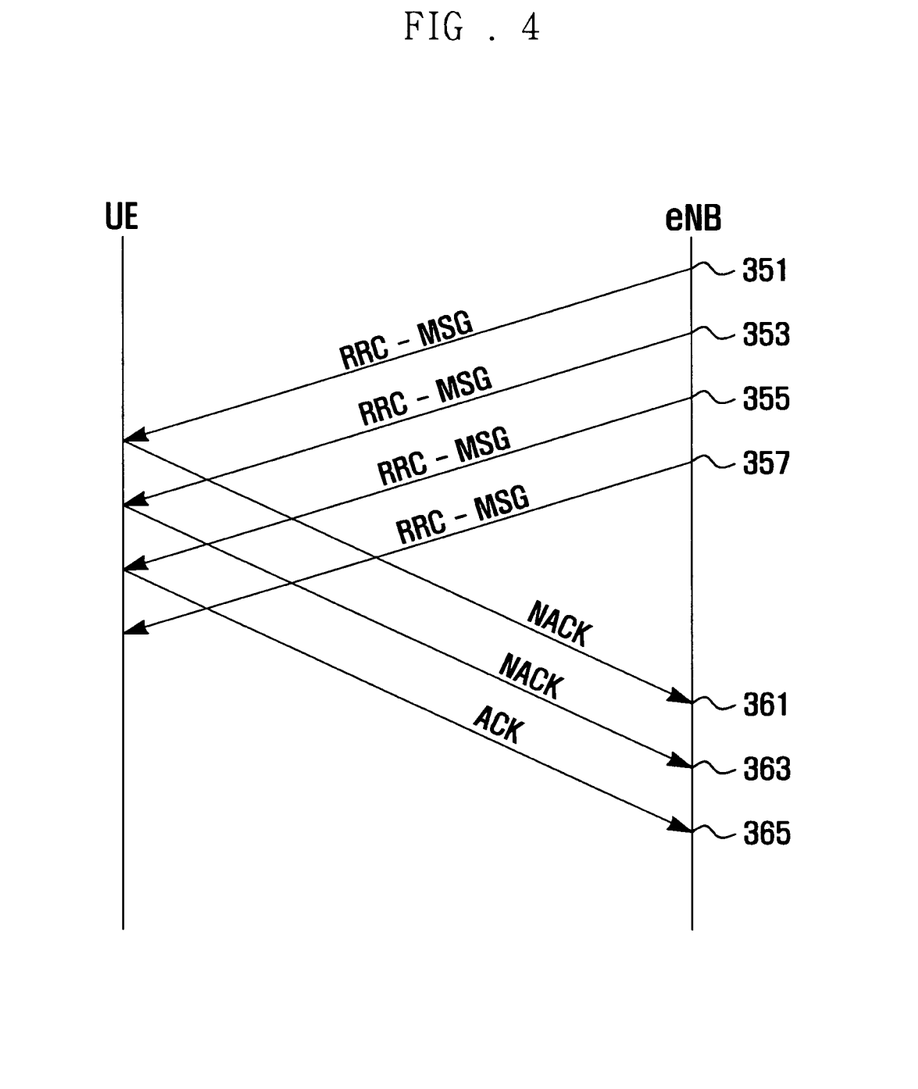

FIGS. 3 and 4 illustrates message flow diagrams for an exchange of RRC messages and ACK/NACK messages between a UE and an eNB in an RRC message transmission method according to an exemplary embodiment of the present invention. In the exemplary embodiment of FIGS. 3 and 4, the eNB is the transmitter and the UE is the receiver. However, the RRC message transmission method of the present invention can be applied when the UE is a transmitter and the eNB is a receiver. Although the RRC message is transmitted at an interval of TTI in FIGS. 3 and 4, the transmission interval can be configured to more than one TTI. Although it is depicted that the RRC message is transmitted 4 times in FIGS. 3 and 4, the number of the transmissions of the same RRC message can be configured to 2 to 8 times since the RRC message and the ACK/NACK message are exchanged at an interval of the 8 TTIs.

Referring to FIG. 3, the eNB as the transmitter transmits the RRC message 4 times at TTI. That is, the eNB transmits the RRC message 311 and repeats the transmission of the RRC at TTI 313 to 317. Accordingly, the UE as the receiver can receive the same RRC messages transmitted at steps 313 to 317.

If the RRC message has been received, the UE transmits an ACK/NACK message depending on whether the RRC message is erroneous. That is, the UE analyzes the RRC message transmitted at step 311 and transmits, if the RRC message is received successfully, an ACK message and otherwise, a NACK message at step 321. In this manner, the UE checks the RRC messages transmitted at steps 313 to 317 and transmits the ACK/NACK message in response to the corresponding RRC messages.

If an ACK message has been received, this means that the RRC message is successfully and thus the eNB ignores the ACK/NACK messages following the ACK message. That is, if it has been detected that the UE received the RRC message successfully by means of the ACK message, the eNB terminates the retransmission process upon receipt of the ACK message.

Referring to FIG. 4, the eNB as the transmitter transmits the same RRC message 4 times at TTI 351, 353, 355, and 357). In the example of FIG. 4, the RRC message transmitted at steps 351 and 353 are erroneous and the RRC message transmitted at step 355 is delivered to the UE successfully. Accordingly, the UE transmits the NACK messages to the eNB in response to the individual RRC messages 361 and 363. The eNB receives all of the 4 ACK/NACK messages transmitted by the UE in response to the RRC messages and then determines whether to retransmit the RRC message depending on analysis result about the 4 ACK/NACK messages. Since the ACK message has been received in response to the RRC message transmitted at step 355, the eNB recognizes that the UE received the RRC message successfully 365.

Accordingly, the eNB stops retransmission process upon receipt of the ACK message at step 365. In this manner, the transmitter transmits the same RRC message multiple times and, if at least one of the multiple transmissions of the same RRC message is responded by means of the ACK message, the transmitter stops retransmission process, thereby reducing the RRC message retransmission delay and improving the service quality.

Figure 5:
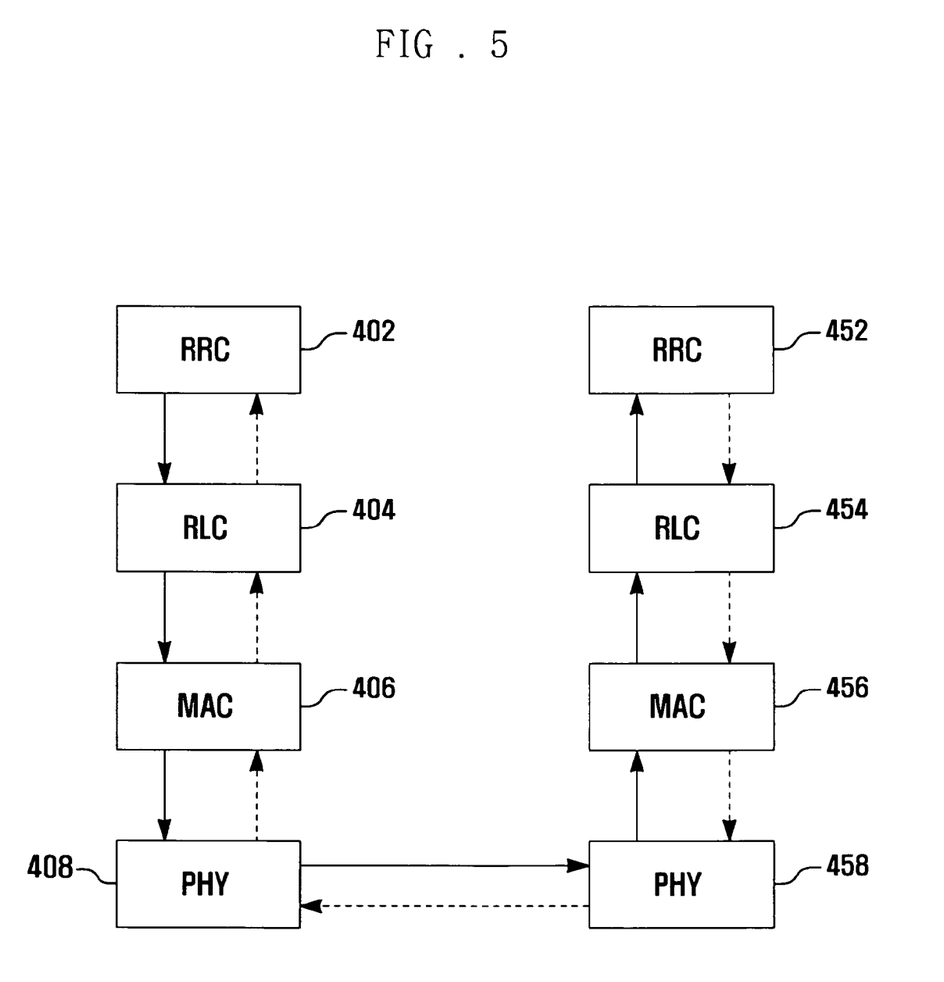
FIG. 5 illustrates operations of a receiver and a transmitter for supporting an RRC message transmission method according to an exemplary embodiment of the present invention.

FIG. 5 illustrates operations of a receiver and a transmitter for supporting an RRC message transmission method according to an exemplary embodiment of the present invention. In the exemplary embodiment of FIG. 5, an eNB transmits an RRC message, and a UE receives the RRC message transmitted by the eNB and transmits an ACK/NACK message in response to the RRC message.

The radio protocol stack of the LTE system includes a Radio Resource Control (RRC) layer, a Radio Link Control (RLC) layer, a Media Access Control (MAC) layer, and a Physical (PHY) layer. As shown in FIG. 5, the eNB includes an RRC entity 402, an RLC entity 404, a MAC entity 406, and a PHY entity 408; and the UE includes an RRC entity 452, an RLC entity 454, a MAC entity 456, and a PHY entity 458.

The RRC entities 405 and 452 control layer 3 are responsible for signaling between the eNB and the UE, link connection and release, broadcast of system information, establishment/modification/release of radio bearers, and RRC connection mobility procedures. The RLC entities 404 and 454 are responsible for segmentation of the RRC packets transferred by the corresponding RRC entities 402 and 452 into Protocol Data Units (PDUs) in size appropriate for Automatic Repeat Request (ARQ) operation. The MAC entities 406 and 456 are connected to multiple RLC entities to multiplex the RLC PDUs to be transmitted into MAC PDUs and demultiplex the received MAC PDUs into RLC PDUs. The PHY entities 408 and 458 are responsible for performing channel coding and modulation on the MAC PDUs to be transmitted and transmit the OFDM symbols over the radio channel and performing channel demodulation and decoding on the received OFDM symbols and deliver the decoded MAC PDUs to the MAC entities 406 and 456.

In FIG. 5, the RRC entity 402 generates multiple duplicates of an RRC message and transfers the duplicates of the RRC message to the RLC entity. The solid line arrows denote the paths of the RRC message transmitted by the transmitter (i.e., the eNB in FIG. 5), and the dotted line arrows denote the paths of the ACK/NACK message transmitted by the receiver (i.e., the UE in FIG. 5).

The RRC entity 402 of the eNB transmits the RRC message via the RLC entity 404, the MAC entity 406, and the PHY entity 408; and the RRC entity 452 of the UE receives the RRC message via the PHY entity 458, the MAC entity 456, and the RRC entity 454. Here, the RRC message is transmitted repeatedly at TTI (or at an interval of two or more TTIs) as shown in FIG. 3. That is, the RRC entity 402 transfers the duplicates of the RRC message to the lower layer (i.e., RLC entity).

The RRC entity 452 of the UE checks the duplicates of the RRC message received in series and determines whether the RLC message has been received normally. If the RRC message has been received normally, the RRC entity 452 transfers an ACK message to the lower layers. Otherwise, if the RRC message has been received abnormally, the RRC entity 452 transfers a NACK message to the lower layers. The ACK/NACK message is transmitted in the reverse order of the RRC message as denoted by the dotted line arrows so as to be received by the RRC entity 402 of the eNB. The RRC entity 402 of the eNB may receive multiple ACK/NACK messages in response to the duplicates of the RRC message. If an ACK message has been received, this means that the UE has received the RRC message and thus the RRC entity 402 of the eNB stops the retransmission process. Only if all the ACK/NACK messages received in response to the duplicates of the RRC message have been NACK messages, the RRC entity 402 of the eNB performs retransmission.

Figure 6:
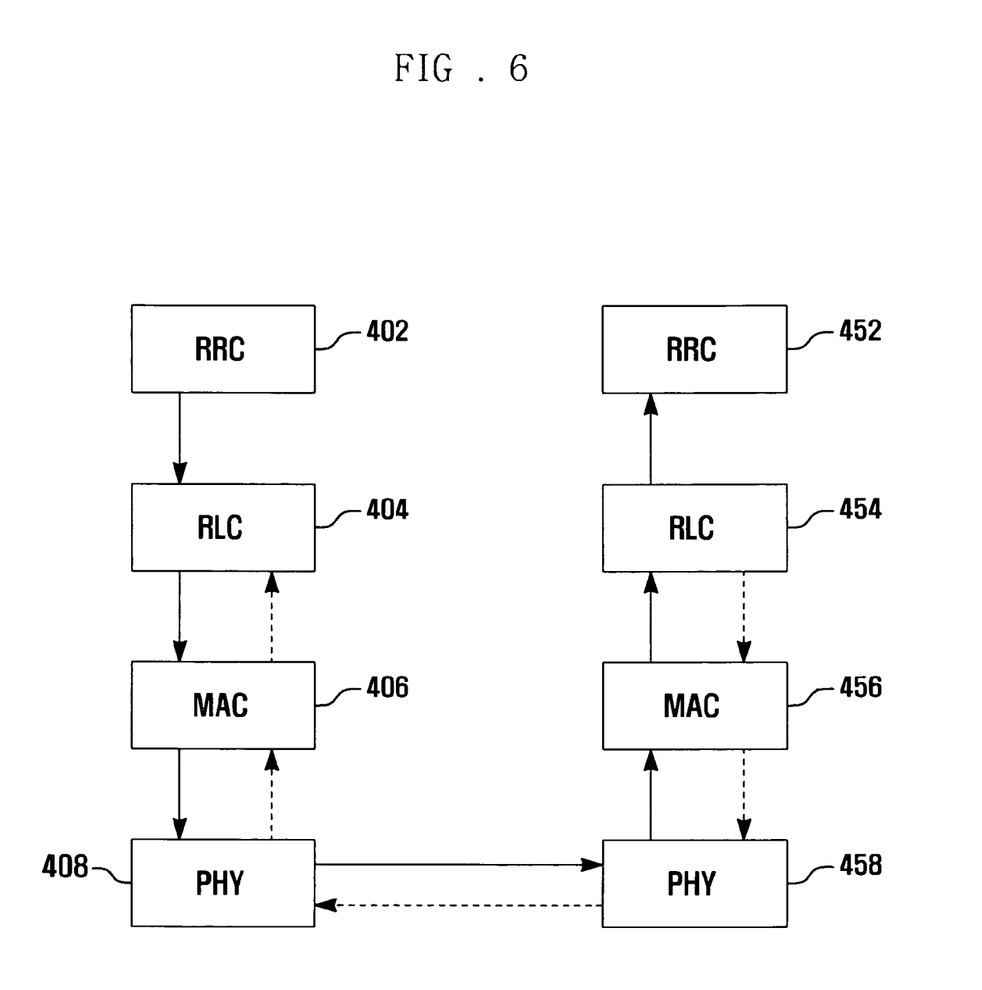
FIG. 6 illustrates operations of a receiver and a transmitter for supporting an RRC message transmission method according to another exemplary embodiment of the present invention.

FIG. 6 illustrates operations of a receiver and a transmitter for supporting an RRC message transmission method according to another exemplary embodiment of the present invention. In the exemplary embodiment of FIG. 6, an eNB transmits an RRC message, and a UE receives the RRC message transmitted by the eNB and transmits an ACK/NACK message in response to the RRC message.

In FIG. 6, the RRC entity 402 of the eNB generates and transfers an RRC message to the RLC entity 404, and the RLC entity 404 generates multiple duplicates of the RRC message to be transmitted to the UE. The RRC entity 402 of the eNB transfers the RRC message with consecutive transmission control information to the lower layer, i.e., the RLC entity 404. If the RRC message with the consecutive transmission control information has been received, the RLC entity 404 reserves the TTIs virtually as if multiple RRC messages are received from the RRC entity 402 in series based on the consecutive transmission control information. Thereafter, the RLC entity 404 transmits the RRC message preset number of times (e.g., 4 times as shown in FIG. 3) at TTI and thus the RRC message is delivered to the RRC entity 452 of the UE through the path as denoted by the solid line arrows repeatedly.

The RLC entity 454 of the UE analyzes the RRC messages received at TTI to evaluate the normality of the RRC message. If the RRC message has been received normally in a TTI, the RLC entity 454 transfers an ACK message to the lower layers. Otherwise, if the RRC message has been received abnormally, the RLC entity 454 transfers a NACK message to the lower layers. The ACK/NACK message is delivered to the RLC entity 404 of the eNB through the path as denoted by the dotted line arrows. The RLC entity of the eNB may receive the NACK messages up to the number of the RRC message transmissions. If an ACK message has been received in a TTI, this means that the UE has received the RRC message normally and thus the RLC entity 404 of the eNB stops the retransmission process. That is, the RLC entity 404 of the transmitter performs retransmission of the corresponding RRC message only when the NACK messages as many as the number of consecutive transmissions of the same RRC message.

Figure 7:
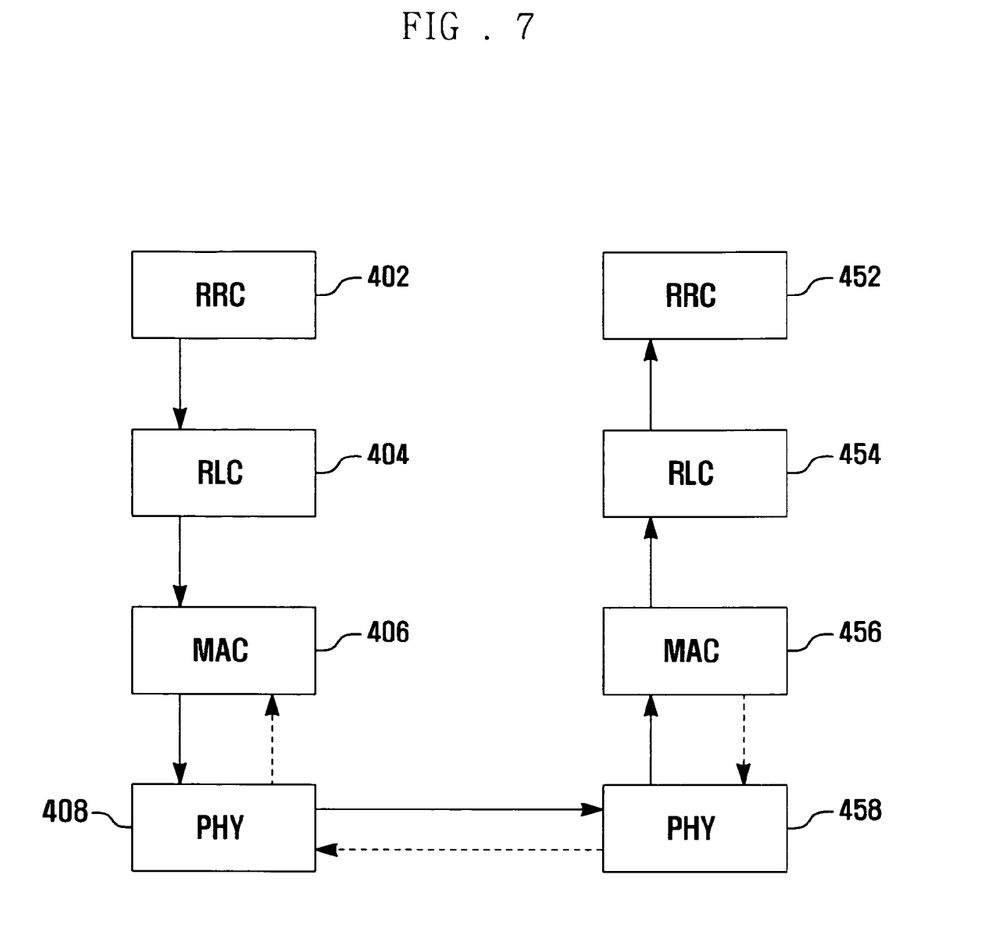
FIG. 7 illustrates operations of a receiver and a transmitter for supporting an RRC message transmission method according to another exemplary embodiment of the present invention.

FIG. 7 illustrates operations of a receiver and a transmitter for supporting an RRC message transmission method according to another exemplary embodiment of the present invention. In the exemplary embodiment of FIG. 7, an eNB transmits an RRC message, and a UE receives the RRC message transmitted by the eNB and transmits an ACK/NACK message in response to the RRC message.

In FIG. 7, the RRC entity 402 of the eNB generates and transfers an RRC message with consecutive transmission control information to the RLC entity 404, and the RLC entity 404 transfers the RRC message with the consecutive transmission control information to the MAC entity 406. If the RRC message with the consecutive transmission control information has been received, the MAC entity 406 reserves the TTIs virtually as if multiple RRC messages are received from the RRC entity 402 in series base on the consecutive transmission control information. Thereafter, the MAC entity 406 transmits the RRC message preset number of times at TTI and thus the RRC message is delivered to the RRC entity 452 through the path as denoted by the solid line arrows repeatedly.

The MAC entity 456 of the UE analyzes the RRC messages received at TTI to evaluate the normality of the RRC message. If the RRC message has been received normally in a TTI, the MAC entity 456 transfers an ACK message to the lower layer. Otherwise, if the RRC message has been received abnormally in a TTI, the MAC entity 456 transfers a NACK message to the lower layer. The ACK/NACK message is delivered to the MAC entity 406 of the eNB through the path as denoted by the dotted line arrows. The MAC entity of the neb may receive the NACK messages up to the number of the RRC message transmissions. If an ACK message has been received in a TTI, this means that the UE has received the RRC message normally and thus the MAC entity 406 of the eNB stops the retransmission process. That is, the MAC entity 406 of the transmitter performs retransmission of the corresponding RRC message only when the NACK messages as many as the number of consecutive transmissions of the same RRC message.

As described above, the RRC message transmission method of the present invention is advantageous to reduce the interruption time by minimizing the retransmission times of RRC message.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A message reception method of a receiver in a wireless communication system, the method comprising:
   receiving a message at least two times from a transmitter in the wireless communication system based on a predetermined transmission time interval; and
   transmitting an acknowledgment message or a negative-acknowledgment message at least two times to the transmitter in response to the message received at least two times respectively,
   wherein the transmitter is adapted to transmit the message at least two times until the acknowledgment message is received from the receiver, and
   wherein the transmitter is adapted to drop the acknowledgment message or the negative-acknowledgment message in response to the message received after a first acknowledgment message in response to the message is received by the transmitter.

2. The message reception method of claim 1, wherein the message is a Radio Resource Control (RRC) message.

3. The message reception method of claim 2, wherein the message is received at a number of Transmission Time Intervals (TTIs).

4. The message reception method of claim 2, wherein the transmitter is a base station and the receiver is a mobile station.

5. The message reception method of claim 2, wherein the message is generated by:
   generating duplicates of the RRC message on an RRC layer of the transmitter; and transmitting the duplicates of the RRC message consecutively through a physical layer by a Radio Link Control (RLC) layer or a Media Access Control (MAC) layer.

6. The message reception method of claim 2, wherein the message is generated by:
   generating, at an RRC layer of the transmitter, a transmission control information;
   transferring the RRC message with the transmission control information from the RRC layer to a Radio Link Control (RLC) layer;
   generating, at the RLC layer, duplicates of the RRC message based on the transmission control information; and
   transmitting, at the RLC layer, the duplicates of the RRC message to the receiver consecutively through a Media Access Control (MAC) layer and a Physical (PHY) layer.

7. The message reception method of claim 2, wherein the message is generated by:
   generating, at an RRC layer of the transmitter, a transmission control information;
   transferring the RRC message with the transmission control information from the RRC layer to a Radio Link Control (RLC) layer;
   transferring the RRC message with the transmission control information from the RLC layer to a Media Access Control (MAC) layer;
   generating, at the MAC layer, duplicates of the RRC message based on the transmission control information; and
   transmitting, at the MAC layer, the duplicates of the RRC message to the receiver consecutively through a Physical (PHY) layer.

8. A message transmission method of a transmitter in a wireless communication system, the method comprising:
   transmitting a message to a receiver in the wireless communication system, wherein the message is transmitted at least two times based on a predetermined transmission time interval;
   receiving an acknowledgment message or a negative-acknowledgement message at least two times in response to the message transmitted at least two times respectively, wherein the message is transmitted at least two times to the receiver until the acknowledgement message is received from the receiver; and
   dropping, by the transmitter, the acknowledgment message or a negative-acknowledgment message in response to the message received after a first acknowledgment message in response to the message is received from the receiver.

9. The message transmission method of claim 8, wherein the message is a Radio Resource Control (RRC) message, and the predetermined interval is an integer multiple of a Transmission Time Interval (TTI).

10. The message transmission method of claim 8, wherein the transmitter is a base station and the receiver is a mobile station.

11. The message transmission method of claim 9, wherein transmitting the message comprises:
    generating duplicates of the RRC message on an RRC layer of the transmitter; and
    transmitting the duplicates of the RRC message consecutively through a physical layer by a Radio Link Control (RLC) layer or a Media Access Control (MAC) layer.

12. The message transmission method of claim 9, wherein transmitting the message comprises:

generating, at an RRC layer of the transmitter, a transmission control information;
    transferring the RRC message with the transmission control information from the RRC layer to a Radio Link Control (RLC) layer;
    generating, at the RLC layer, duplicates of the RRC message based on the transmission control information; and
    transmitting, at the RLC layer, the duplicates of the RRC message to the receiver consecutively through a Media Access Control (MAC) layer and a Physical (PHY) layer.

13. The message transmission method of claim 9, wherein transmitting the message comprises:
    generating, at an RRC layer of the transmitter, a transmission control information;
    transferring the RRC message with the transmission control information from the RRC layer to a Radio Link Control (RLC) layer;
    transferring the RRC message with the transmission control information from the RLC layer to a Media Access Control (MAC) layer;
    generating, at the MAC layer, duplicates of the RRC message based on the transmission control information; and
    transmitting, at the MAC layer, the duplicates of the RRC message to the receiver consecutively through a Physical (PHY) layer.

14. A terminal capable of communicating in a wireless communication system, the terminal comprising:
    a transmitter configured to transmit a message at least two times based on a predetermined transmission time interval;
    a receiver configured to receive an acknowledgment message or a negative-acknowledgment message at least two times in response to the message transmitted at least two times respectively; and
    a controller configured to control the transmitter and the receiver and to drop the acknowledgment message or a negative-acknowledgment message in response to the message received after a first acknowledgment message in response to the message is received, wherein the message is transmitted at least two times until acknowledgment message is received.

15. The terminal of claim 14, wherein the message is a Radio Resource Control (RRC) message.

16. The terminal of claim 15, wherein the predetermined interval is a Transmission Time Interval (TTI).

17. The terminal of claim 14, wherein the terminal is one of a base station and a mobile station.

18. The terminal of claim 14, wherein:
    the controller is configured to generate duplicates of the RRC message on an RRC layer of the transmitter; and
    the transmitter is configured to transmit the duplicates of the RRC message consecutively through a physical layer by a Radio Link Control (RLC) layer or a Media Access Control (MAC) layer.

19. The terminal of claim 14, wherein the controller is configured to:
    generate, at an RRC layer, a transmission control information;
    transfer the RRC message with the transmission control information from the RRC layer to a Radio Link Control (RLC) layer;
    generate, at the RLC layer, duplicates of the RRC message based on the transmission control information; and transmit, at the RLC layer, the duplicates of the RRC message to the receiver consecutively through a Media Access Control (MAC) layer and a Physical (PHY) layer.

20. The terminal of claim 14, wherein the controller is configured to:
  generate, at an RRC layer of the transmitter, a transmission control information;
  transfer the RRC message with the transmission control information from the RRC layer to a Radio Link Control (RLC) layer;
  transfer the RRC message with the transmission control information from the RLC layer to a Media Access Control (MAC) layer;
  generate, at the MAC layer, duplicates of the RRC message based on the transmission control information; and
  transmit, at the MAC layer, the duplicates of the RRC message to the receiver consecutively through a Physical (PHY) layer.

* * * * *